(12) United States Patent
Lota

(10) Patent No.: US 8,172,299 B2
(45) Date of Patent: *May 8, 2012

(54) COMPARTMENT DOOR WITH FORCE AND EFFORT CONTROL

(75) Inventor: Charan Singh Lota, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 820 days.

This patent is subject to a terminal disclaimer.

(21) Appl. No.: 12/245,787

(22) Filed: Oct. 6, 2008

(65) Prior Publication Data

US 2010/0083580 A1 Apr. 8, 2010

(51) Int. Cl.
*B60R 11/06* (2006.01)

(52) U.S. Cl. .................... 296/37.8; 296/24.34

(58) Field of Classification Search .............. 49/324, 49/381, 386, 400, 401; 296/37.3, 37.12, 296/37.8, 24.34; 220/263, 264, 830; 224/483
See application file for complete search history.

(56) References Cited

U.S. PATENT DOCUMENTS

| | | | |
|---|---|---|---|
| 1,180,975 | A | 4/1916 | Chapman |
| 4,997,221 | A | 3/1991 | Tolle et al. |
| 5,112,091 | A | 5/1992 | Kluting et al. |
| 5,413,317 | A | 5/1995 | Spoerre |
| 5,489,153 | A | 2/1996 | Berner et al. |
| 5,901,885 | A * | 5/1999 | Iida .............................. 222/517 |
| 6,401,449 | B1 | 6/2002 | Hofmann et al. |
| 7,017,956 | B2 * | 3/2006 | Kogami ........................ 292/224 |
| 7,210,711 | B2 | 5/2007 | Dirnberger et al. |
| 7,591,395 | B2 * | 9/2009 | Hamaguchi ................... 220/830 |

* cited by examiner

*Primary Examiner* — Katherine W Mitchell
*Assistant Examiner* — Catherine A Kelly
(74) *Attorney, Agent, or Firm* — Gifford, Krass, Sprinkle, Anderson & Citkowski, P.C.

(57) ABSTRACT

The present invention discloses a compartment door assembly that provides for a compartment door that has controlled movement between a closed position and an open position. The assembly includes a compartment door for covering a compartment, the compartment door movable between the closed position and the open position. A cam having a cam arm, an elongated member and a tension member can also be included.

10 Claims, 3 Drawing Sheets

COMPARTMENT DOOR WITH FORCE AND EFFORT CONTROL

FIELD OF THE INVENTION

This invention relates generally to a compartment door and more specifically to a compartment door assembly that provides force and effort control for moving the compartment door between a closed position and an open position.

BACKGROUND OF THE INVENTION

Doors that provide access to compartments are common. For example, compartments within a motor vehicle, such as compartments for holding electronic devices, sunglasses, beverage containers and the like can be covered by a compartment door when in use and/or not in use. Such a compartment door typically moves between a closed position and an open position, thereby providing a cover and affording access to the compartment. When the compartment door is in the closed position, the interior of the vehicle can be more aesthetically pleasing and/or items within the compartment can be prevented from "flying out" during a sudden stop, impact and the like.

In order to ensure that items within a given compartment do not become flying projectiles during an accident, Federal Motor Vehicle Safety Standards (FMVSS) require that the compartment door be held in the closed position with a force that is sufficient to withstand predetermined levels of impacts. For example, current FMVSS 201 requires that a compartment door remain in the closed position when the compartment is subjected to 10 G (10 times the force of gravity) side to side, 10 G up/down and 30 G forward/aft forces.

Some heretofore compartment doors have been held closed using a simple spring and lever. However, such a spring and lever design can result in the compartment door moving with an undesirable speed during opening and/or closing after being opened or closed, respectively, a certain amount. For example, such a compartment door can "slam" open and/or closed after being opened or closed a certain amount and "turned loose" by an individual. As such, a compartment door that has controlled speed while opening and/or closing such that undesirable movement does not occur would be useful.

SUMMARY OF THE INVENTION

The present invention discloses a compartment door assembly that provides for a compartment door that has controlled movement between a closed position and an open position. It is appreciated that the movement of the compartment door can also be controlled when moving between the open position and the closed position. In addition to the compartment door, the assembly can include a cam having a cam arm. The cam can be attached to and rotatable about a cam axis, and also operable to rotate about the cam axis when the compartment door moves between the closed position and the open position. The assembly can also include an elongated arm that has an arcuate section between a first end and a second end, the first end pivotally attached to a support member a predetermined distance from the cam axis and the second end spaced apart from the first end and located such that the elongated arm can be in contact with the cam. In addition, the cam is located such that the cam arm can travel along at least part of the arcuate section of the elongated arm when the compartment door is moved between the closed position and the open position.

A tension member can also be included, the tension member being attached to the second end of the elongated arm and being operable to hold the elongated arm in contact with the cam. The tension arm can be a spring having a first end attached to a support tab and a second end attached to the second end of the elongated arm. With the tension member holding the elongated member in contact with the cam, the cam arm can be urged to travel along at least part of the arcuate section when the compartment door moves between the closed position and the open position, and vice versa.

The cam arm traveling along at least part of the arcuate section with the tension member holding the elongated arm in contact with the cam can result in controlled movement of the compartment door when it moves. In some instances, the compartment door assembly controls force required to move the compartment door at a predetermined opening or closing speed. In addition, the compartment door assembly can provide for control of an opening or closing speed of the compartment door for a predetermined force applied thereto.

DETAILED DESCRIPTION OF THE INVENTION

Figure 1:
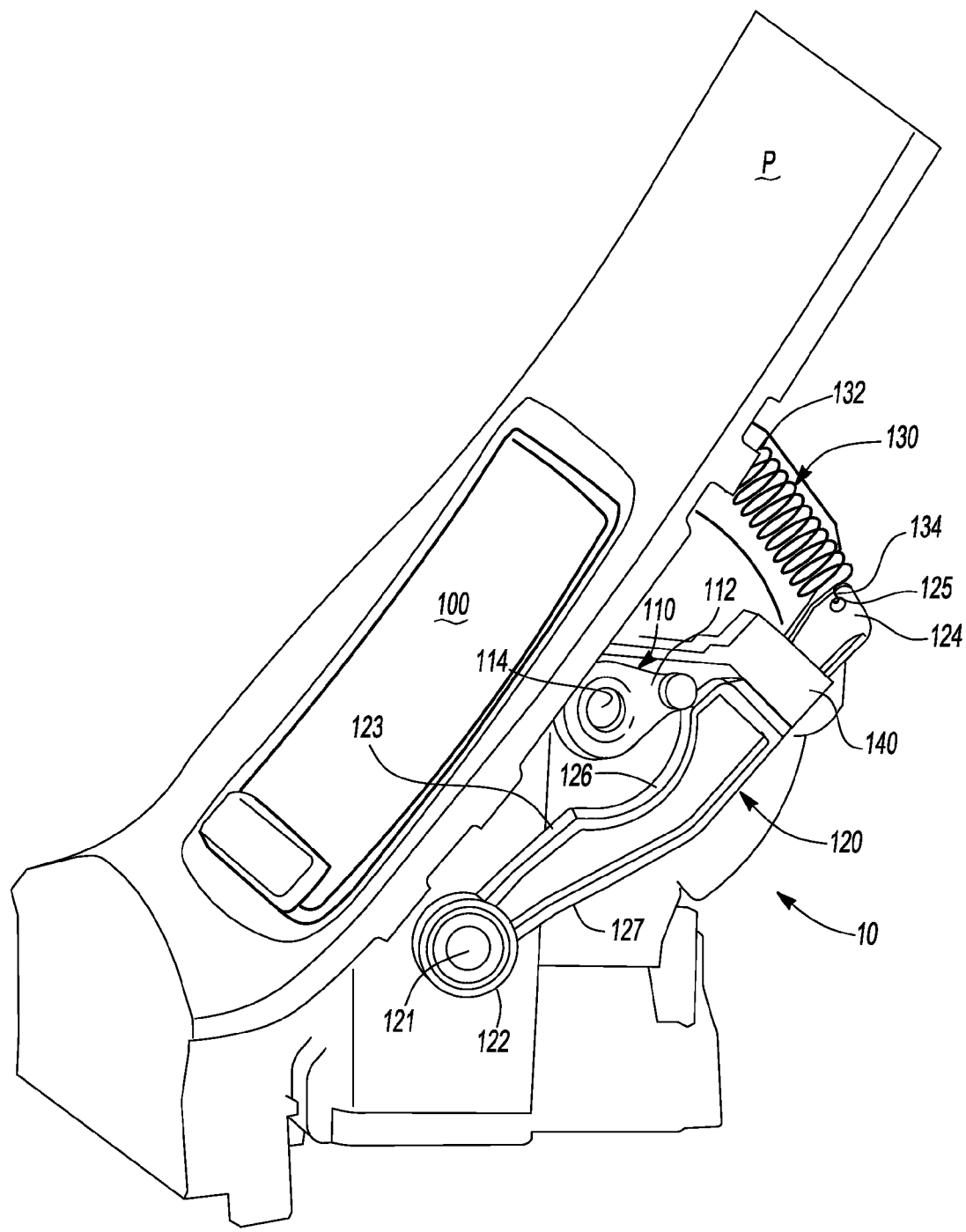
FIG. 1 is a perspective view of an embodiment of the present invention illustrating a compartment door in a closed position.

The present invention discloses a compartment door assembly that provides for controlled movement of a compartment door. As such, the compartment door assembly has utility as a door that covers a compartment.

The compartment door assembly provides for controlled movement of the compartment door as it is moved between a closed position and an open position. It is appreciated that the compartment door assembly can also control the movement of the compartment door as it is moved from the open position to the closed position. As such, for the purposes of the present invention, the term "between a/the closed position and an/the open position" also includes "between an/the open position and a/the closed position."

The compartment door assembly includes a compartment door for covering a compartment, the compartment door being movable between the closed position and the open position. A cam having a cam arm can be attached to and rotatable about a cam axis and be operable to rotate about the cam axis when the compartment door moves between the closed position and the open position. The cam arm can have a length and in some instances the compartment door and the cam can move and/or rotate about the same axis.

An elongated arm having an arcuate section between a first end and a second end can also be included, the first end being pivotally attached to a support member at a predetermined distance from the cam axis, and the second end being spaced apart from the first end and being located such that the elongated arm can be in contact with the cam. The cam is located such that the cam arm can travel along at least part of the arcuate section when the component door is moved.

A tension member can be attached to the second end of the elongated arm such that the elongated arm can be held in contact with the cam. In some instances, the tension member can have a first end attached to a support tab and a second end attached to the second end of the elongated arm and tension is applied to the second end. The tension applied to the second end affords for the elongated arm to be pulled against and held in contact with the cam. In some instances the tension member is a spring and may or may not be a coil spring. With the tension member pulling the elongated arm into contact with cam, the cam arm can be urged to travel along at least part of the arcuate section when the compartment door moves between the closed position and the open position.

The cam arm traveling along at least part of the arcuate section with the tension member holding the elongated arm in contact with the cam can result in controlled movement of the compartment door when it moves between the closed position and the open position. In some instances, the compartment door assembly controls force required to move the compartment door at a predetermined opening or closing speed. In other instances, the compartment door assembly can provide for control of an opening or closing speed of the compartment door for a predetermined force applied thereto. In still other instances, the compartment door is held in the closed position with sufficient force such that the door does not open when the compartment and the compartment door assembly are exposed to at least a 10 G side to side force, a 10 G up/down force, and/or a 30 G forward/aft force.

The arcuate section can have a semicircular shape with a radius of curvature and the cam arm can have a length. In addition, the door can have a door axis about which it rotates between the closed position and the open position. In some instances, the cam axis is also the door axis.

Figure 2:
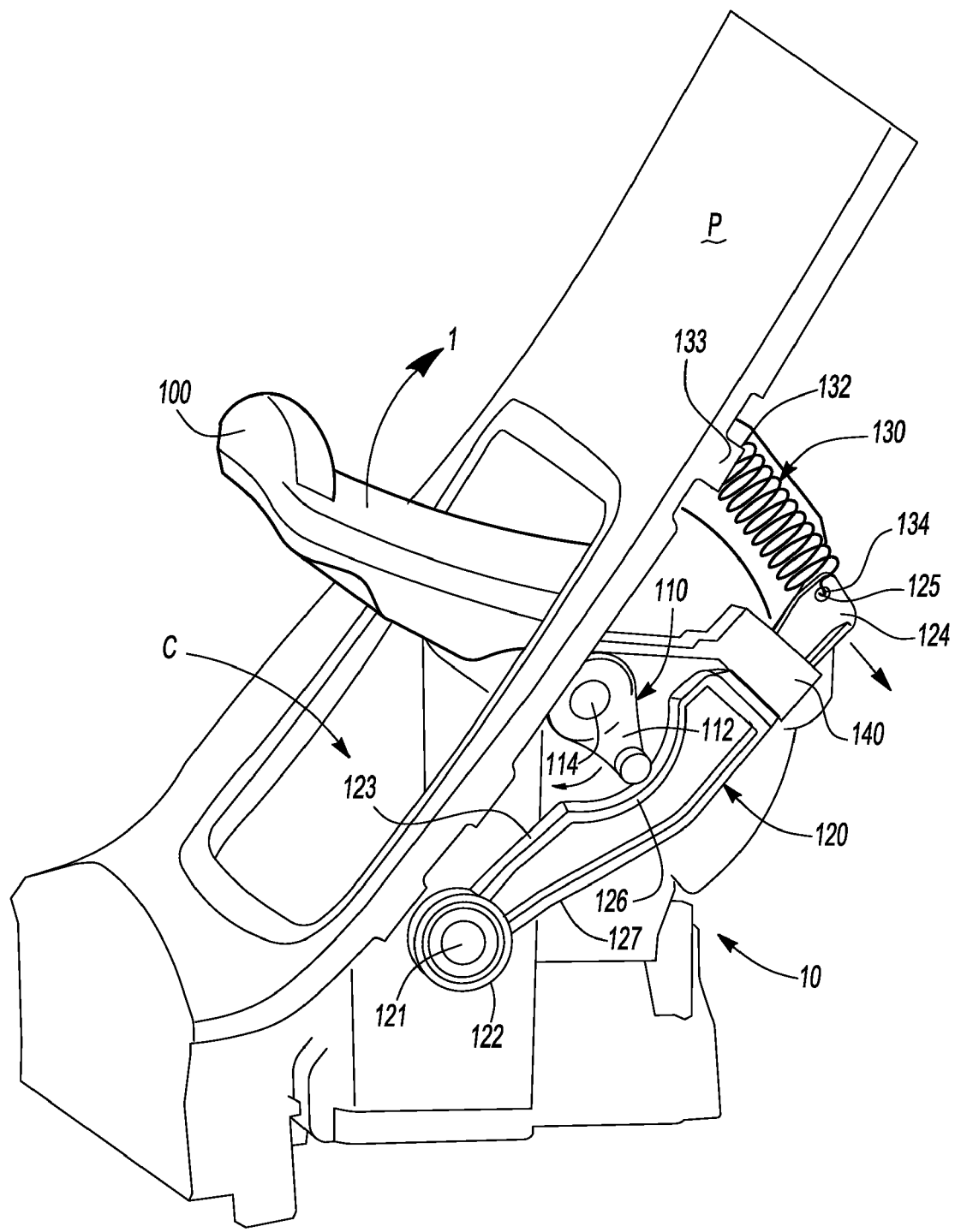
FIG. 2 is a perspective view of the embodiment shown in FIG. 1 illustrating the compartment door moving to an open position.

Turning now to FIGS. 1 and 2, a perspective view of an illustrative embodiment of the compartment door assembly is shown generally at reference numeral 10. The compartment door assembly 10 can include a compartment door 100, a cam 110 and an elongated arm 120. The compartment door 100 can cover and allow access to a compartment C that may or may not be within a panel P.

The compartment door 100 can move between a closed position, illustratively shown in FIG. 1, and an open position. FIG. 2 illustrates the compartment door moving in a first direction 1 from the closed position towards the open position. The cam 110 has a cam arm 112, the cam 110 and cam arm 112 operable to rotate about a cam axis 114. The cam arm 112 can have a length defined by a distance from the center of the cam axis 114 to the furthest point on the cam arm 112. In addition, the cam 110 can rotate about the cam axis 114 when the compartment door 100 moves between the closed position and the open position. In some instances, the compartment door 100 rotates about a door axis (not shown) and the door axis may or may not be the same as the cam axis 114.

The elongated arm 120 has a first end 122 and a second end 124. The first end 122 is pivotally attached to a support member 121. It is appreciated that the elongated arm 120 can move generally towards and away from the cam 110 by pivoting about the support member 121. Extending between the first end 122 and the second end 124 is a cam surface 123 and an oppositely disposed non-cam surface 127. In addition, the cam surface 123 can have an arcuate section 126 between the first end 122 and second end 124, the cam surface 123 being proximate to the cam 110. As shown in FIGS. 1 and 2, as the compartment door 100 moves between the closed position and the open position, the cam arm 112 can travel along at least part of the arcuate section 126. It is appreciated from FIGS. 1 and 2 that the radius of curvature of the arcuate section 126 is greater than the length of cam arm 112 since if this was not the case the compartment door 100 would not move between the closed position and the open position illustrated in the figures.

In some instances, a tension member 130 can be included, the tension member having a first end 132 and a second end 134. The first end 132 can be attached to a tab 133 and the second end 134 can be attached to the second end 124 of the elongated member 120. For example, an aperture 125, tab, slot and the like can be provided within the tab 133 and/or the second end 124 such that the spring can be attached thereto. In this manner, the tension member 130 can hold the cam surface 123 of the elongated arm 120 up against and/or in contact with the cam 110.

Figure 5:
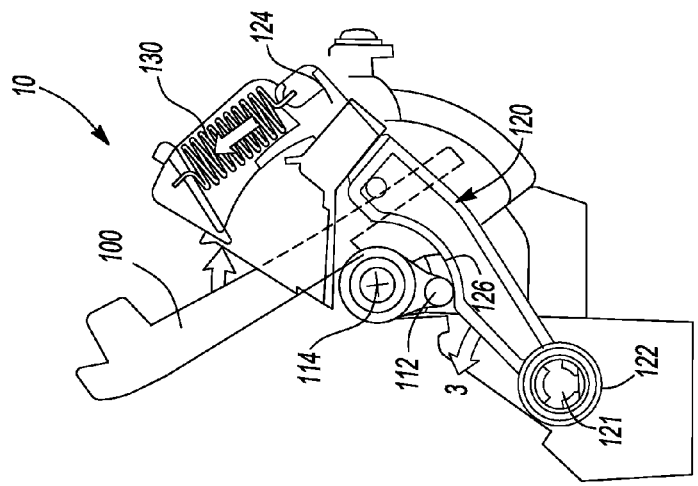
FIG. 5 is a side view of the embodiment shown in FIG. 3 illustrating the compartment door in the open position.
Figure 4:
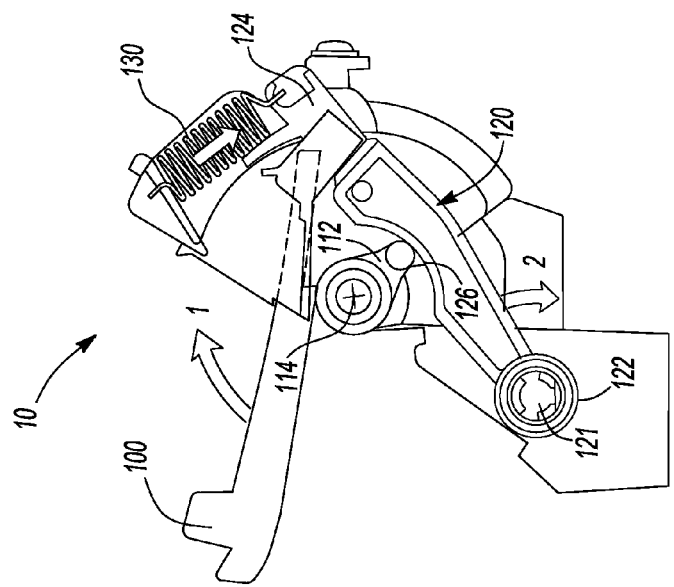
FIG. 4 is a side view of the embodiment shown in FIG. 3 illustrating the compartment door moving from the closed position to the open position.
Figure 3:
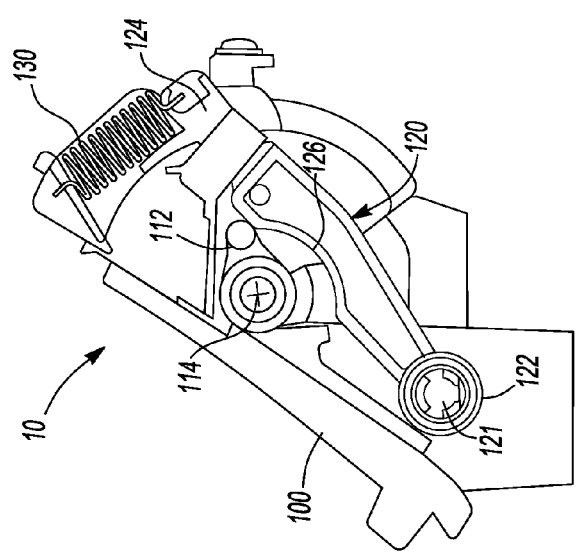
FIG. 3 is a side view of the embodiment shown in FIG. 1 illustrating the compartment door in the closed position.

Turning now to FIGS. 3-5, a side view of the embodiment 10 is shown with movement of the compartment door 100 from the closed position to the open position illustrated, As shown in FIG. 3, when the compartment door 100 is in the closed position, the tension member 130 holds the cam surface 123 of the elongated arm 120 up against and/or in contact with the cam 110. In operation, as force is applied to the compartment door 100 to move it towards the open position, the compartment door 100 moves in the first direction 1, the cam 110 rotates about the cam axis 114 and the cam arm 112 travels along at least part of the arcuate section 126. As the cam arm 112 moves into and/or towards the "deepest" portion of the arcuate section 126, the tension member 130 resists the movement of the elongated member in a second direction 2 and requires that a steady or increasing force be applied to the compartment door 100 in order to continue its opening movement. However, once the cam arm 112 begins moving out of the deepest portion of the arcuate section 126 as shown in FIG. 5, the tension member 130 assists in the movement of the elongated member 130 in a third direction 3, and in combination with the shape of the cam 110 results in a decrease in force required to move the door 100 to the open position and/or a decrease in speed at which the door travels to the open position. In some instances, when the cam arm 112 travels beyond a certain position on the arcuate section 126, the cam 110, arcuate section 126 and tension member 130 result in continued rotation of the cam 110 such that force required to move the compartment door 100 to a fully opened position is reduced or eliminated.

Regarding closing the compartment door 100, the cam arm 112, arcuate section 126 and tension member 130 afford for controlled movement of the compartment door 100 to the closed position and can prevent the door from "slamming" shut. In addition, the position of the cam arm 112 with respect to the cam surface 123 when the compartment door 100 is in the closed position still provides for the tension member 130 to apply a force to keep the door 100 closed. It is appreciated that predetermined shapes, dimensions and spring force of the cam 110, arcuate section 126 and tension member 130 can be such that the force and/or effort to open and close the compartment door 100 can be controlled and/or varied.

In some instances, a predetermined force can be applied to the compartment door 100 when it is in the closed position such that it does not open under simulated impact conditions. For example and for illustrative purposes only, the compartment door 100 can be held in the closed position to meet Federal Motor Vehicle Safety Standard (FMVSS) 201 criteria, for example holding the door closed when a 10 G side to side, 10 G up/down, and/or a 30 G forward/aft force is applied to the compartment and compartment door assembly.

In this manner, a compartment door assembly is provided that controls force required to move the compartment door at a predetermined opening or closing speed and/or controls the opening or closing speed of the compartment door for a predetermined force that is applied thereto. The compartment door 100, cam 110, elongated arm 120 and tension member 130 can be made from any material known to those skilled in the art, illustratively including metals, plastics, ceramics and the like.

The invention is not restricted to the illustrative examples described above. The examples are not intended as limitations on the scope of the invention. Methods, apparatus, compositions and the like described herein are exemplary and not intended as limitations on the scope of the invention. Changes therein and other uses will occur to those skilled in the art. The scope of the invention is defined by the scope of the claims.

I claim:

1. A compartment door assembly comprising:
    a compartment door for covering a compartment, said compartment door movable between a closed position and an open position;
    a cam having a cam arm, said cam and said compartment door rotatable about a cam axis, said cam also operable to rotate about said cam axis when said compartment door moves between said closed position and said open position, said cam arm having a length measured from a center of said cam axis to a furthest point on said cam arm;
    an elongated arm having an arcuate section between a first end and a second end, said arcuate section having a radius of curvature greater than said length of said cam arm, said first end pivotally attached to a support member a predetermined distance from said cam axis, and said second end spaced apart from said first end and located such that said elongated arm is in contact with said cam;
    said cam located such that said cam arm travels along at least part of said arcuate section when said compartment door is moved between said closed position and said open position;
    said cam arm traveling along at least part of said arcuate section operable to control movement of said compartment door when said compartment door moves between said closed position to said open position.

2. The compartment door assembly of claim 1, wherein said cam arm traveling along at least part of said arcuate section controls force required to move said compartment door at a predetermined opening or closing speed.

3. The compartment door assembly of claim 1, wherein said cam arm traveling along at least part of said arcuate section controls an opening or closing speed of said compartment door for a predetermined force applied to said compartment door.

4. The compartment door assembly of claim 1, further comprising a tension member, said tension member attached to said second end of said elongated arm and operable to hold said elongated arm in contact with said cam.

5. The compartment door assembly of claim 4, wherein said tension member is a spring attached said second end of said elongated arm.

6. The compartment door assembly of claim 1, wherein said cam and said compartment door are attached to said cam axis.

7. A compartment door assembly comprising:
    a compartment door for covering a compartment, said compartment door movable between a closed position and an open position, and between said open position and said closed position;
    a cam having a cam arm, said cam and said compartment door attached to and rotatable about a cam axis, said cam also operable to rotate about said cam axis when said compartment door moves between said closed position and said open position, said cam arm having a length measured from a center of said cam axis to a furthest point on said cam arm;
    an elongated arm having an arcuate section between a first end and a second end, said arcuate section having a radius of curvature greater than said length of said cam arm, said first end pivotally attached to a support member a predetermined distance from said cam axis, and said second end spaced apart from said first end and located such that said elongated arm is in contact with said cam; and
    a tension member, said tension member attached to said second end of said elongated arm and operable to hold said elongated arm in contact with said cam;
    said cam located such that said cam arm travels along at least part of said arcuate section when said compartment door is moved between said closed position and said open position;
    said cam arm traveling along at least part of said arcuate section operable to control movement of said compartment door when said compartment door moves between said closed position to said open position.

8. The compartment door assembly of claim 7, wherein said tension member is a spring attached to said second end of said elongated arm.

9. The compartment door assembly of claim 7, wherein said cam arm traveling along at least part of said arcuate section controls force required to move said compartment door at a predetermined opening or closing speed.

10. The compartment door assembly of claim 7, wherein said cam arm traveling along at least part of said arcuate section controls an opening or closing speed of said compartment door for a predetermined force applied to said compartment door.

* * * * *

UNITED STATES PATENT AND TRADEMARK OFFICE
CERTIFICATE OF CORRECTION

PATENT NO.         : 8,172,299 B2                                  Page 1 of 1
APPLICATION NO.    : 12/245787
DATED              : May 8, 2012
INVENTOR(S)        : Charan Singh Lota It is certified that error appears in the above-identified patent and that said Letters Patent is hereby corrected as shown below:

At column 6, line 24, delete "said earn arm" and replace with -- said cam arm --;

At column 6, line 46, delete "said earn arm" and replace with -- said cam arm --.

Signed and Sealed this
Twelfth Day of February, 2013

Teresa Stanek Rea
*Acting Director of the United States Patent and Trademark Office*